(12) United States Patent
Yang et al.

(10) Patent No.: US 11,920,055 B2
(45) Date of Patent: Mar. 5, 2024

(54) BARRIER COMPOSITION AND PRODUCTION PROCESS THEREOF

(71) Applicant: National Taipei University of Technology, Taipei (TW)

(72) Inventors: Chung-Kuang Yang, Taipei (TW); Yi-Hsuan Lai, Taipei (TW); Sheng-Tung Huang, Taipei (TW); Kun-Li Wang, Taipei (TW)

(73) Assignee: NATIONAL TAIPEI UNIVERSITY OF TECHNOLOGY, Taipei (TW)

( * ) Notice: Subject to any disclaimer, the term of this patent is extended or adjusted under 35 U.S.C. 154(b) by 241 days.

(21) Appl. No.: 17/511,294

(22) Filed: Oct. 26, 2021

(65) Prior Publication Data

US 2023/0084277 A1   Mar. 16, 2023

(30) Foreign Application Priority Data

Sep. 3, 2021   (TW) ................. 110132903

(51) Int. Cl.
| | | |
|---|---|---|
| *C09D 183/08* | (2006.01) | |
| *C08G 77/06* | (2006.01) | |
| *C08G 77/26* | (2006.01) | |
| *C09D 5/02* | (2006.01) | |
| *C09D 5/08* | (2006.01) | |

(52) U.S. Cl.
CPC ........... *C09D 183/08* (2013.01); *C08G 77/06* (2013.01); *C08G 77/26* (2013.01); *C09D 5/022* (2013.01); *C09D 5/08* (2013.01)

(58) Field of Classification Search
CPC ........ C09D 183/08; C09D 5/022; C09D 5/08; C09D 5/02; C08G 77/06; C08G 77/26
See application file for complete search history.

(56) References Cited

U.S. PATENT DOCUMENTS 5,844,060 A * 12/1998 Furuya .................. C08G 77/06
528/30

* cited by examiner

*Primary Examiner* — Robert S Jones, Jr.
*Assistant Examiner* — Jiangtian Xu
(74) *Attorney, Agent, or Firm* — Hamre, Schumann, Mueller & Larson, P.C.

(57) ABSTRACT

A process for producing a barrier composition includes subjecting a siloxane compound having 1 to 3 amino groups and an aqueous solution including water and an alcohol to hydrolysis and first-stage condensation under required conditions, subjecting a first colloidal mixture obtained and an additional alcohol to second-stage condensation, subjecting a second colloidal mixture obtained, which has a particular solid content, to heating under required conditions, and subjecting a cured product obtained to aging under required conditions. A barrier composition produced by the process is also disclosed.

7 Claims, No Drawings

BARRIER COMPOSITION AND PRODUCTION PROCESS THEREOF

CROSS-REFERENCE TO RELATED APPLICATION

This application claims priority of Taiwanese Patent Application No. 110132903, filed on Sep. 3, 2021.

FIELD

The disclosure relates to a barrier composition and a production process thereof, and more particularly to a barrier composition capable of blocking oxygen transmission and a production process thereof.

BACKGROUND

Since electronic products nowadays tend to be smaller in thickness and weight for being easily portable, glass substrates conventionally used for packaging organic light-emitting elements in displays of electronic products have been gradually replaced by flexible plastic substrates. Examples of such flexible plastic substrates are polyimide (PI) substrates. However, compared to glass substrates, polyimide substrates have worse ability to block oxygen transmission. Therefore, oxygen gas in the air might easily penetrate into inside of displays through polyimide substrates and contact with organic light-emitting elements, speeding up the aging process of such organic light-emitting elements.

In order to solve the aforesaid problem, a common inorganic material, such as $TiO_2$, $SiO_2$, $Al_2O_3$, ZnO, or $ZnSnO_x$, is used to form a barrier layer on a surface of a polyimide substrate through a dry and vacuum coating treatment. However, the barrier layer formed by such treatment might easily break and generate cracks, rendering the blocking effect poor.

SUMMARY

A first object of the disclosure is to provide a process for producing a barrier composition, which can alleviate at least one of the drawbacks of the prior art.

The process includes:
  subjecting a siloxane compound having 1 to 3 amino groups and an aqueous solution including water and an alcohol to a hydrolysis reaction and a first-stage condensation reaction, so that a first colloidal mixture including first colloidal particles is obtained, a molar ratio of the water in the aqueous solution to the siloxane compound expressed in decimal form being not less than 3 and less than 9, the hydrolysis reaction and the first-stage condensation reaction being conducted at a temperature ranging from 0° C. to 5° C. for at least 3 hours;
  subjecting the first colloidal mixture and an additional alcohol to a second-stage condensation reaction, so as to obtain a second colloidal mixture including second colloidal particles and having a solid content that is not less than 20 wt % and less than 35 wt %;
  subjecting the second colloidal mixture to a heating treatment at a temperature not lower than 120° C. and lower than 150° C. for 2 hours, so as to obtain a cured product; and
  subjecting the cured product to an aging treatment at a temperature not lower than 21.5° C. and lower than 58.5° C. and a relative humidity ranging from 56% to 82%.

A second object of the disclosure is to provide a barrier composition which can alleviate at least one of the drawbacks of the prior art, and which is produced by the aforesaid process.

DETAILED DESCRIPTION

It is to be understood that, if any prior art publication is referred to herein, such reference does not constitute an admission that the publication forms a part of the common general knowledge in the art, in Taiwan or any other country.

For the purpose of this specification, it will be clearly understood that the word "comprising" means "including but not limited to", and that the word "comprises" has a corresponding meaning.

Unless otherwise defined, all technical and scientific terms used herein have the meaning commonly understood by a person skilled in the art to which this disclosure belongs. One skilled in the art will recognize many methods and materials similar or equivalent to those described herein, which could be used in the practice of this disclosure. Indeed, this disclosure is in no way limited to the methods and materials described.

The present disclosure provides a process for producing a barrier composition, which includes:
  subjecting a siloxane compound having 1 to 3 amino groups and an aqueous solution including water and an alcohol to a hydrolysis reaction and a first-stage condensation reaction, so that a first colloidal mixture including first colloidal particles is obtained, a molar ratio of the water in the aqueous solution to the siloxane compound expressed in decimal form being not less than 3 and less than 9, the hydrolysis reaction and the first-stage condensation reaction being conducted at a temperature ranging from 0° C. to 5° C. for at least 3 hours;
  subjecting the first colloidal mixture and an additional alcohol to a second-stage condensation reaction, so as to obtain a second colloidal mixture including second colloidal particles and having a solid content that is not less than 20 wt % and less than 35 wt %;
  subjecting the second colloidal mixture to a heating treatment at a temperature not lower than 120° C. and lower than 150° C. for 2 hours, so as to obtain a cured product; and
  subjecting the cured product to an aging treatment at a temperature not lower than 21.5° C. and lower than 58.5° C. and a relative humidity ranging from 56% to 82%.

Examples of the siloxane compound include, but are not limited to, (3-aminopropyl)trimethoxysilane (APTMS) ($NH_2CH_2CH_2CH_2$—$Si(OCH_3)_3$), [3-(2-aminoethylamino)propyl]trimethoxysilane (DAPTMS) ($NH_2CH_2CH_2NH$—$CH_2CH_2CH_2$—$Si(OCH_3)_3$), and 3-[2-(2-aminoethylamino)ethylamino]propyltrimethoxysilane (ETAS) ($NH_2CH_2CH_2NHCH_2CH_2NH$—$CH_2CH_2CH_2$—$Si(OCH_3)_3$).

In the hydrolysis reaction, the water and the alcohol in the aqueous solution serve to hydrolyze the alkoxy group of the siloxane compound. Examples of the alcohol include, but are not limited to ethanol, propanol, and butanol. In certain embodiments, the alcohol is ethanol.

In certain embodiments, the amount of the alcohol in the aqueous solution is 6.76 moles to 14.26 moles per mole of the siloxane compound. It should be noted that the molar ratio expressed in decimal form (not less than 3 and less than 9) as required by the production process of the present disclosure can enable the first colloidal mixture to have satisfactory film-forming ability after the first colloidal mixture is coated on a surface of a polyimide substrate and subjected to drying for removal of the water and the alcohol which are from the aqueous solution, and can further enable the barrier composition to have a low oxygen transmission rate. The molar ratio of the water in the aqueous solution to the siloxane compound expressed in decimal form being not less than 3 and less than 9 means that the molar ratio of the water in the aqueous solution to the siloxane compound is not less than 3:1 and less than 9:1.

According to the present disclosure, in order to facilitate the hydrolysis reaction, the first-stage condensation reaction, and the second-stage condensation, the aqueous solution may further include hydrochloric acid (HCl). According to the present disclosure, for the first colloidal particles of the first colloidal mixture and the second colloidal particles of the second colloidal mixture to have an uniform, small average particle size, and hence for the oxygen barrier film formed from the barrier composition produced by the method of the present disclosure to be smoothly formed on a surface of a polyimide substrate, the aqueous solution may have a pH value of 1. In certain embodiments, the amount of HCl is 0.018 mole per mole of the siloxane compound.

It should be noted that, for the first colloidal particles of the first colloidal mixture to have an uniform, small average particle size and hence to have a transparent characteristic, and for the first colloidal mixture to have satisfactory film-forming ability after being coated on a surface of a polyimide substrate and subjected to drying for removal of the water and the alcohol which are from the aqueous solution, the hydrolysis reaction and the first-stage condensation reaction are conducted at a temperature ranging from 0° C. to 5° C. for at least 3 hours as required by the production process of the present disclosure.

It should be noted that, for the cured product to have satisfactory adhesion, the solid content of the second colloidal mixture is controlled to be not less than 20 wt % and less than 35 wt % as required by the production process of the present disclosure.

In certain embodiments, for enabling the barrier composition to have a lower oxygen transmission rate and better film-forming ability, the second-stage condensation reaction is conducted at 20° C. for 8 hours.

In the second-stage condensation reaction, the additional alcohol serves to hydrolyze the alkoxy group on the first colloidal particles of the first colloidal mixture. Examples of the additional alcohol include, but are not limited to, ethanol, propanol, and butanol. In certain embodiments, the additional alcohol is ethanol. The additional alcohol and the alcohol in the aqueous solution may be the same. In certain embodiments, the amount of the additional alcohol is 0.12 mole per mole of the siloxane compound.

It should be noted that, for the cured product to have satisfactory harness and adhesion when formed on a surface of a polyimide substrate, the temperature and time of the heating treatment are controlled to be not lower than 120° C. and lower than 150° C. and to be 2 hours, respectively, as required by the production process of the present disclosure. In certain embodiments, for the cured product to be not easily crackable and have satisfactory film-forming ability, the second colloidal mixture is pre-heated gradually to the temperature not lower than 120° C. and lower than 150° C., and is heated at the temperature not lower than 120° C. and lower than 150° C. for the heating treatment to proceed. The gradual pre-heating of the second colloidal mixture may be conducted at a fixed heating rate. Examples of the fixed heating rate include, but are not limited to, 1° C./minute, 2° C./minute, 3° C./minute, 4° C./minute, and 5° C./minute. In certain embodiments, the fixed heating rate is 5° C./minute.

According to the present disclosure, in order to more smoothly form the barrier composition on a surface of a polyimide substrate, and in order to enable the barrier composition to have a lower oxygen transmission rate, the aging treatment may be conducted for 24 hours to 168 hours.

The present disclosure also provides a barrier composition produced by the aforesaid production process.

According to the present disclosure, the barrier composition may have N is spectra and Si 2p spectra obtainable through X-ray photoelectron spectroscopy. The N is spectra include an —$NH_2$ characteristic peak and an —$NH_3^+$ characteristic peak. Based on a total integral area of the N is spectra (i.e. 100%), a percentage of an integral area of the —$NH_2$ characteristic peak is larger than 65%. In certain embodiments, based on the total integral area of the N is spectra, the percentage of the integral area of the —$NH_2$ characteristic peak is larger than 65% and not larger than 72%. The Si 2p spectra include an Si—O—Si characteristic peak and an Si—O—C characteristic peak. Based on a total integral area of the Si 2p spectra (i.e. 100%), a percentage of an integral area of the Si—C—Si characteristic peak is larger than 65%. In certain embodiments, based on the total integral area of the Si 2p spectra, the percentage of the integral area of the Si—C—Si characteristic peak is larger than 65% and not larger than 74.1%.

According to the present disclosure, the barrier composition may have an oxygen transmission rate higher than 0 cc/($m^2$ day) and lower than 26 cc/($m^2$·day), pencil hardness ranging from B to H, and an adhesion class ranging from 3B to 5B determined according to ASTM D3359, i.e. Standard Test Methods for Rating Adhesion by Tape Test (2017).

The present disclosure will be further described by way of the following examples. However, it should be understood that the following examples are intended solely for the purpose of illustration and should not be construed as limiting the present disclosure in practice.

1. Production of Examples and Comparative Examples 1-1. Production of Example 1

In step (a), mole of [3-(2-aminoethylamino)propyl] trimethoxysilane (DAPTMS) and an aqueous solution having pH 1 and containing 3 moles of water, 10.28 moles of ethanol, and 0.018 mole of HCl were mixed and allowed to undergo a hydrolysis reaction and a first-stage condensation reaction at 2° C. for 3 hours. Therefore, a first colloidal mixture was obtained.

In step (b), 0.12 mole of additional ethanol was added to the first colloidal mixture, and a second-stage condensation reaction was allowed to proceed at 20° C. for 8 hours. Thus, a second colloidal mixture having a solid content of 20.48 wt % was obtained.

In step (c), the second colloidal mixture was pre-heated gradually to 120° C. at a heating rate of 5° C./minute, and was then heated at 120° C. for 2 hours, so as to form a cured product.

In step (d), the cured product was subjected to aging at a temperature of 23±1.5° C. and a relative humidity of 58±2% for 24 hours so as to form a barrier composition.

1-2. Production of Examples 2 to 10

Examples 2 to 10 were produced generally according to the procedure described in subsection 1-1 for producing Example 1, except for the following differences. As shown in Tables 1 to 3, at least one of the following was modified: the type of the siloxane compound having 1 to 3 amino groups in step (a), the amounts of the components in the aqueous solution in step (a), the solid content of the second colloidal mixture in step (b), the temperature for the heating treatment in step (c), and the time, temperature, and relative humidity for the aging treatment in step (d). Regarding the modification in the type of the siloxane compound having 1 to 3 amino groups, (3-aminopropyl)trimethoxysilane (APTMS) was used for producing Example 5, and 3-[2-(2-aminoethylamino)ethylamino]propyltrimethoxysilane (ETAS) was used for producing Example 6.

1-3. Production of Comparative Example 1

Comparative Example 1 was produced generally according to the procedure described in subsection 1-1 for producing Example 1, except that no aging treatment was conducted (i.e. step (d) was not conducted).

1-4. Production of Comparative Examples 2 to 6

Comparative Examples 2 to 6 were produced generally according to the procedure described in subsection 1-1 for producing Example 1, except for the following differences. As shown in Tables 3 and 4, at least one of the following was modified: the amounts of the components in the aqueous solution in step (a), the occurrence of the second-stage condensation reaction and the solid content of the second colloidal mixture in step (b), the temperature for the heating treatment applied in step (c), and the occurrence or the conditions of the aging treatment in step (d).

2. Evaluation of Characteristics

The examples and comparative examples were subjected to evaluation of characteristics in the same manner described below.

2-1. Evaluation for Film-Forming Ability of First Colloidal Mixture

A polyimide substrate (Manufacturer: Mortech Corporation, Taiwan; Catalog No.: Mordohar E306964; thickness: 75 μm), which had been washed with ethanol and subjected to drying at 160° C. for 0.5 hour, was subjected to surface cleaning using a high pressure air blow gun to remove the dust on the polyimide substrate. Subsequently, the polyimide substrate was placed on an electric coater (Manufacturer: ERICHSEN GmbH&Co.; Model: COATMASTER 510).

The first colloidal mixture of the respective example or the respective comparative example was placed in an injection syringe and was extruded from the injection syringe onto an upper edge of a surface of the polyimide substrate. Subsequently, the first colloidal mixture was evenly coated on the surface of the polyimide substrate using the electric coater at a coating speed of 2 mm/s, such that a colloidal layer was formed on the surface of the polyimide substrate. The polyimide substrate with the colloidal layer was placed in an oven, and was pre-heated to 120° C. at a heating rate of 5° C./minute and was then subjected to 2 hours of heating at 120° C. Accordingly, the colloidal layer on the polyimide substrate was cured to form a cured layer with a thickness of 1.5 μm.

The polyimide substrate with the cured layer was taken out from the oven and allowed to cool down to 25° C. The cured layer was observed to determine whether a film could be successfully formed. If the cured layer could completely cover the surface of the polyimide substrate, the corresponding colloidal layer had film-forming ability (such ability is marked with "Y" in Tables 1 to 4). If the cured layer could not completely cover the surface of the polyimide substrate, the corresponding colloidal layer had no film-forming ability (such inability is marked with "N" in Table 4).

2-2. Pencil Hardness Test

The barrier composition of the respective example or the respective comparative example (obtained in section 1 above) was subjected to pencil hardness test according to Wolff-Wilborn method using pencils having hardness ranging from 6B to 9H. The hardness of the first pencil leaving a scratch on the barrier composition was recorded.

2-3. Adhesion Test

The cured product of the respective example or the respective comparative example, or the barrier composition of the respective example or the respective comparative example, was formed on a surface of a polyimide substrate (Manufacturer: Mortech Corporation, Taiwan; Catalog No.: Mordohar E306964; thickness: 75 μm). Subsequently, an adhesion test was conducted using a cross hatch cutter and tape (Manufacturer: 3M; Catalog. No.: Scotch 610) according to Test Method B (Cross-cut test) of ASTM D3359 (2017 edition), i.e. Standard Test Methods for Rating Adhesion by Tape Test (2017). To form the cured product on the surface of the polyimide substrate, the second colloidal mixture (obtained in section 1 above) was coated on the surface of the polyimide substrate according to the procedure described in subsection 2-1 for coating the first colloidal mixture, and was subjected to the heating treatment according to the procedure described in the corresponding subsection of section 1 above. To form the barrier composition on the surface of the polyimide substrate, the cured produced was first formed according to the procedure described above, and was further subjected to the aging treatment according to the procedure described in the corresponding subsection of section 1 above.

2-4. Determination of Surface Roughness

The barrier composition of the respective example or the respective comparative example (obtained in section 1 above) was subjected to determination of the following parameters of surface roughness using an atomic force microscope (Manufacturer: Park System; Model: XE-100) at a scan range of 5 μm×5 μm: arithmetic mean deviation (Ra), ten point height of irregularities (Rz), and root mean square deviation (Rq).

2-5. Measurement of Contact Angle

The barrier composition of the respective example or the respective comparative example was formed on a surface of a polyimide substrate (Manufacturer: Mortech Corporation, Taiwan; Catalog No.: Mordohar E306964; thickness: 75 μm) according to the procedure described in subsection 2-3 above, followed by forming a water drop (deionized water, 0.5 mL) on a surface of the barrier composition. The contact angle formed by the water drop, i.e. the angle formed between the surface of the barrier composition and the line tangent to the edge of the water drop, was measured using a contact angle meter (Manufacturer: Sindatek Instrument Co., Ltd., Taiwan; Model: 100SB).

2-6. Determination of Oxygen Transmission Rate

The barrier composition of the respective example or the respective comparative example was formed on a surface of a polyimide substrate (Manufacturer: Mortech Corporation, Taiwan; Catalog No.: Mordohar E306964; thickness: 75 μm) according to the procedure described in subsection 2-3 above. Subsequently, determination of oxygen transmission rate was conducted using an oxygen transmission rate analyzer (Manufacturer: MOCON; Model: OX-TRAM® Module 2/61). Specifically, the determination of oxygen transmission rate was conducted at 23° C., a relative humidity of 0%, and a gas flow rate of 10 sccm/cell.

2-7. X-Ray Photoelectron Spectroscopy (XPS) Analysis

The barrier composition of the respective example or the respective comparative example (obtained in section 1 above) was subjected to surface cleaning through plasma etching. Subsequently, the barrier composition was subjected to XPS analysis using an X-ray photoelectron spectrometer (Manufacturer: JEOL; Model: JPS-9030). Specifically, the excitation source was MgKe, the voltage was 10 kV, the current was 10 mA, the scanning range was from 0 eV to 1200 eV, the analysis software was Spectral Data Processor v7.0, the adventitious carbon located at 284.8 eV was used to calibrate the XPS raw data, and analysis of elemental binding energy was performed.

Results:

TABLE 1

| | | | Example | | | |
|---|---|---|---|---|---|---|
| | | | 1 | 2 | 3 | 4 |
| Siloxane compound having 1 to 3 amino groups | Type | | DAPTMS | DAPTMS | DAPTMS | DAPTMS |
| | Amount (mole) | | 1 | 1 | 1 | 1 |
| Aqueous solution | HCl | Amount (mole) | 0.018 | 0.018 | 0.018 | 0 |
| | Water | Amount (mole) | 3 | 3 | 3 | 3 |
| | Ethanol | Amount (mole) | 10.28 | 10.28 | 10.28 | 10.28 |
| Hydrolysis reaction and first-stage condensation reaction | Temperature (° C.) | | 2 | 2 | 2 | 2 |
| | Time (hr) | | 3 | 3 | 3 | 3 |
| Film-forming ability of first colloidal mixture | | | Y | Y | Y | Y |
| Amount of additional ethanol (mole) | | | 0.12 | 0.12 | 0.12 | 0.12 |
| Second-stage condensation reaction | Temperature (° C.) | | 20 | 20 | 20 | 20 |
| | Time (hr) | | 8 | 8 | 8 | 8 |
| Solid content of second colloidal mixture (wt %) | | | 20.48 | 20.48 | 20.48 | 20.48 |
| Heating treatment | Temperature (° C.) | | 120 | 120 | 120 | 120 |
| | Time (hr) | | 2 | 2 | 2 | 2 |
| Adhesion class of cured product | | | 4B | 4B | 4B | 4B |
| Aging treatment | Temperature (±1.5° C.) | | 23 | 23 | 23 | 23 |
| | Relative humidity (±2%) | | 58 | 58 | 58 | 58 |
| | Time (hr) | | 24 | 48 | 168 | 48 |
| Barrier composition | Pencil hardness | | B | B | H | B |
| | Adhesion class | | 4B | 4B | 4B | 4B |
| | Parameters of surface roughness | Rq (nm) | 0.69 | 0.567 | 0.437 | 0.65 |
| | | Ra (nm) | 0.552 | 0.453 | 0.349 | 0.51 |
| | | Rz (nm) | 5.091 | 4.282 | 3.491 | 4.65 |
| | Contact angle (°) | | 67.62 | 73.09 | 74.09 | 71.5 |
| | Oxygen transmission rate [cc/m$^2$ · day)] | | 16.468 | 2.574 | 1.471 | 3.58 |
| | Percentage of integral area of —NH$_2$ characteristic peak (%) | | 65.8 | 72.3 | 71.9 | N/A |
| | Percentage of integral area of Si—O—Si characteristic peak (%) | | 65.7 | 71.1 | 74.1 | N/A |

N/A: not available

TABLE 2

| | | | Example | | | |
|---|---|---|---|---|---|---|
| | | | 5 | 6 | 7 | 8 |
| Siloxane compound having 1 to 3 amino groups | Type | | APTMS | ETAS | DAPTMS | DAPTMS |
| | Amount (mole) | | 1 | 1 | 1 | 1 |
| Aqueous solution | HCl | Amount (mole) | 0 | 0 | 0.018 | 0.018 |
| | Water | Amount (mole) | 3 | 3 | 3 | 3 |
| | Ethanol | Amount (mole) | 6.76 | 14.26 | 10.28 | 10.28 |
| Hydrolysis reaction and first-stage condensation reaction | Temperature (° C.) | | 2 | 2 | 2 | 2 |
| | Time (hr) | | 3 | 3 | 3 | 3 |
| Film-forming ability of first colloidal mixture | | | Y | Y | Y | Y |
| Amount of additional ethanol (mole) | | | 0.12 | 0.12 | 0.12 | 0.12 |
| Second-stage condensation reaction | Temperature (° C.) | | 20 | 20 | 20 | 20 |
| | Time (hr) | | 8 | 8 | 8 | 8 |
| Solid content of second colloidal mixture (wt %) | | | 20.5 | 20.43 | 20.48 | 20.48 |
| Heating treatment | Temperature (° C.) | | 120 | 120 | 120 | 120 |
| | Time (hr) | | 2 | 2 | 2 | 2 |
| Adhesion class of cured product | | | 3B | 4B | 5B | 5B |
| Aging treatment | Temperature (±1.5° C.) | | 23 | 23 | 40 | 40 |
| | Relative humidity (±2%) | | 58 | 58 | 58 | 58 |
| | Time (hr) | | 48 | 48 | 24 | 48 |
| Barrier composition | Pencil hardness | | B | B | B | B |
| | Adhesion class | | 3B | 4B | 5B | 5B |
| | Parameters of surface roughness | Rq (nm) | 2.12 | 0.98 | 0.413 | 0.265 |
| | | Ra (nm) | 1.51 | 0.78 | 0.293 | 0.211 |
| | | Rz (nm) | 23.93 | 5.85 | 4.523 | 2.11 |

TABLE 2-continued

|  |  | Example | | | |
|---|---|---|---|---|---|
|  |  | 5 | 6 | 7 | 8 |
| Contact angle (°) | | 49.1 | 62.65 | 83.4 | 79.8 |
| Oxygen transmission rate [cc/(m² · day)] | | 25.50 | 0.59 | 0.72 | <0.1 |
| Percentage of integral area of —NH₂ characteristic peak (%) | | N/A | N/A | N/A | N/A |
| Percentage of integral area of Si—O—Si characteristic peak (%) | | N/A | N/A | N/A | N/A |

N/A: not available

TABLE 3

|  |  |  | Example | | Comparative Example | |
|---|---|---|---|---|---|---|
|  |  |  | 9 | 10 | 1 | 2 |
| Siloxane compound having 1 to 3 amino groups | Type | | DAPTMS | DAPTMS | DAPTMS | DAPTMS |
|  | Amount (mole) | | 1 | 1 | 1 | 1 |
| Aqueous solution | HCl | Amount (mole) | 0.018 | 0.018 | 0.018 | 0.018 |
|  | Water | Amount (mole) | 3 | 3 | 3 | 3 |
|  | Ethanol | Amount (mole) | 10.28 | 10.28 | 10.28 | 10.28 |
| Hydrolysis reaction and first-stage condensation reaction | Temperature (° C.) | | 2 | 2 | 2 | 2 |
|  | Time (hr) | | 3 | 3 | 3 | 3 |
| Film-forming ability of first colloidal mixture | | | Y | Y | Y | Y |
| Amount of addition ethanol (mole) | | | 0.12 | 0.12 | 0.12 | 0.12 |
| Second-stage condensation reaction | Temperature (° C.) | | 20 | 20 | 20 | 20 |
|  | Time (hr) | | 8 | 8 | 8 | 8 |
| Solid content of second colloidal mixture (wt %) | | | 20.48 | 20.48 | 20.48 | 20.48 |
| Heating treatment | Temperature (° C.) | | 120 | 120 | 120 | 120 |
|  | Time (hr) | | 2 | 2 | 2 | 2 |
| Adhesion class of cured product | | | 5B | 5B | 4B | 4B |
| Aging treatment | Temperature (±1.5° C.) | | 40 | 40 | — | 60 |
|  | Relative humidity (±2%) | | 80 | 80 | — | 58 |
|  | Time (hr) | | 24 | 48 | — | 24 |
| Barrier composition | Pencil hardness | | B | B | 2B | B |
|  | Adhesion class | | 5B | 5B | 4B | 4B |
|  | Parameters of surface roughness | Rq (nm) | 0.278 | 0.298 | 0.586 | 0.221 |
|  |  | Ra (nm) | 0.223 | 0.233 | 0.403 | 0.177 |
|  |  | Rz (nm) | 2.195 | 2.475 | 9.759 | 1.631 |
|  | Contact angle (°) | | 91.1 | 79.3 | 62.81 | 84.1 |
|  | Oxygen transmission rate [cc/(m² · day)] | | 1.61 | <0.1 | 185.188 | 95 |
|  | Percentage of integral area of —NH₂ characteristic peak (%) | | N/A | N/A | 61.8 | N/A |
|  | Percentage of integral area of Si—O—Si characteristic peak (%) | | N/A | N/A | 61.7 | N/A |

—: not conducted;
N/A: not available

TABLE 4

|  |  |  | Comparative Example | | | |
|---|---|---|---|---|---|---|
|  |  |  | 3 | 4 | 5 | 6 |
| Siloxane compound having 1 to 3 amino groups | Type | | DAPTMS | DAPTMS | DAPTMS | DAPTMS |
|  | Amount (mole) | | 1 | 1 | 1 | 1 |
| Aqueous solution | HCl | Amount (mole) | 0.018 | 0 | 0 | 0.018 |
|  | Water | Amount (mole) | 3 | 9 | 3 | 3 |
|  | Ethanol | Amount (mole) | 10.28 | 9.16 | 3.43 | 10.28 |
| Hydrolysis reaction and first-stage condensation reaction | Temperature (° C.) | | 2 | 2 | 2 | 2 |
|  | Time (hr) | | 3 | 3 | 3 | 3 |
| Film-forming ability of first colloidal mixture | | | Y | N | Y | Y |
| Amount of addition ethanol (mole) | | | 0.12 | — | 0.01 | 0.12 |
| Second-stage condensation reaction | Temperature (° C.) | | 20 | — | 20 | 20 |
|  | Time (hr) | | 8 | — | 8 | 8 |
| Solid content of second colloidal mixture (wt %) | | | 20.48 | — | 35.34 | 20.48 |
| Heating treatment | Temperature (° C.) | | 120 | — | 120 | 150 |
|  | Time (hr) | | 2 | — | 2 | 2 |

TABLE 4-continued

|  |  | Comparative Example | | | |
|---|---|---|---|---|---|
|  |  | 3 | 4 | 5 | 6 |
| Adhesion class of cured product | | 4B | N/A | 0B | 5B |
| Aging treatment | Temperature (±1.5° C.) | 60 | — | — | 23 |
|  | Relative humidity (±2%) | 58 | — | — | 58 |
|  | Time (hr) | 48 | — | — | 24 |
| Barrier composition | Pencil hardness | B | N/A | N/A | 2B |
|  | Adhesion class | 4B | N/A | N/A | 5B |
|  | Parameters   Rq (nm) | 0.284 | N/A | N/A | 0.614 |
|  | of surface   Ra (nm) | 0.222 | N/A | N/A | 0.395 |
|  | roughness    Rz (nm) | 2.16 | N/A | N/A | 16.196 |
|  | Contact angle (°) | 80.8 | N/A | N/A | 55.9 |
|  | Oxygen transmission rate [cc/(m$^2$ · day)] | 89 | N/A | N/A | 176 |
|  | Percentage of integral area of —NH$_2$ characteristic peak (%) | N/A | N/A | N/A | N/A |
|  | Percentage of integral area of Si—O—Si characteristic peak (%) | N/A | N/A | N/A | N/A |

—: not conducted;
N/A: not available

Referring to Tables 1 to 4, compared to the barrier compositions of Comparative Examples 1 to 6, each of the barrier compositions of Examples 1 to 10 had a much lower oxygen transmission rate, and hence could effectively block oxygen gas from passing through the polyimide substrate. Turning to the barrier composition of Comparative Example 1, which was produced without an aging treatment, such barrier composition had an extremely high oxygen transmission rate and could hardly block oxygen gas from penetrating into the polyimide substrate. Furthermore, the barrier compositions of Comparative Examples 2 and 3, which were produced through an aging treatment conducted at a temperature not lower than 58.5° C. (i.e. 60±1.5° C.), had a high oxygen transmission rate and hence could not block oxygen gas from passing through the polyimide substrate. In addition, the barrier composition of Comparative Example 6, which was produced through a heating treatment conducted at a temperature not lower than 150° C. (i.e. 150° C.), had an extremely high oxygen transmission rate and could hardly block oxygen gas from penetrating into the polyimide substrate. Therefore, it can be inferred that the barrier composition of the present disclosure, which is produced by virtue of the hydrolysis reaction and first-stage condensation reaction, second-stage condensation reaction, heating treatment, and aging treatment required by the process of the present disclosure, can prevent an organic light-emitting element from aging by blocking oxygen gas from penetrating into a polyimide substrate.

Comparative Examples 4 to 6 are further addressed as follows. The first colloidal mixture of Comparative Example 4 could not form a film and be further used to produce a barrier composition, since the molar ratio of the water in the aqueous solution to the siloxane compound having 1 to 3 amino groups expressed in decimal form was 9 (i.e. not less than 9). Because the second colloidal mixture of Comparative Example 5 had a solid content of 35.34 wt % (i.e. not less than 35 wt %), the cured product of Comparative Example 5 had an adhesion class lower than 3B, thereby being unable to securely adhere to the polyimide substrate and liable to be easily peeled off. The barrier composition of Comparative Example 6, which was produced through a heating treatment conducted at a temperature not lower than 150° C. (i.e. 150° C.), had unsatisfactory hardness. Thus, the barrier composition of the present disclosure, which is produced by virtue of the first-stage condensation reaction, second-stage condensation reaction, heating treatment, and aging treatment required by the process of the present disclosure, can have satisfactory hardness and satisfactory adhesion for securely adhering to an polyimide substrate and not being easily peeled off.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, FIGURE, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A process for producing a barrier composition, comprising:
    subjecting a siloxane compound having 1 to 3 amino groups and an aqueous solution including water and an alcohol to a hydrolysis reaction and a first-stage condensation reaction, so that a first colloidal mixture including first colloidal particles is obtained, a molar ratio of the water in the aqueous solution to the siloxane compound expressed in decimal form being not less than 3 and less than 9, the hydrolysis reaction and the first-stage condensation reaction being conducted at a temperature ranging from 0° C. to 5° C. for at least 3 hours;
    subjecting the first colloidal mixture and an additional alcohol to a second-stage condensation reaction, so as to obtain a second colloidal mixture including second colloidal particles and having a solid content that is not less than 20 wt % and less than 35 wt %;

subjecting the second colloidal mixture to a heating treatment at a temperature not lower than 120° C. and lower than 150° C. for 2 hours, so as to obtain a cured product; and subjecting the cured product to an aging treatment at a temperature not lower than 21.5° C. and lower than 58.5° C. and a relative humidity ranging from 56% to 82%.

2. The process as claimed in claim 1, wherein the siloxane compound is selected from the group consisting of (3-aminopropyl)trimethoxysilane, [3-(2-aminoethylamino)propyl]trimethoxysilane, and 3-[2-(2-aminoethylamino)ethylamino]propyltrimethoxysilane.

3. The process as claimed in claim 1, wherein the aqueous solution further includes hydrochloric acid.

4. The process as claimed in claim 1, wherein the alcohol in the aqueous solution is ethanol.

5. The process as claimed in claim 1, wherein the second colloidal mixture is pre-heated gradually to the temperature not lower than 120° C. and lower than 150° C., and is heated at the temperature not lower than 120° C. and lower than 150° C. for the heating treatment to proceed.

6. The process as claimed in claim 1, wherein the second-stage condensation reaction is conducted at 20° C. for 8 hours.

7. The process as claimed in claim 1, wherein the aging treatment is conducted for 24 hours to 168 hours.

* * * * *